US012567945B2

(12) United States Patent
  Ramadhane et al.

(10) Patent No.: US 12,567,945 B2
(45) Date of Patent: Mar. 3, 2026

(54) ENHANCING PRIVACY IN BIOMETRICS-BASED AUTHENTICATION SYSTEMS

(71) Applicant: International Business Machines Corporation, Armonk, NY (US)

(72) Inventors: Mohamed Zouhaier Ramadhane, Azcapotzalco (MX); Ricardo Ramos, Lima (PE); Syed Ali, Irvine, CA (US); Mauro Marzorati, Lutz, FL (US); Fernando R Zuliani, Newport Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/180,891

(22) Filed: Mar. 9, 2023

(65) Prior Publication Data

US 2024/0305441 A1  Sep. 12, 2024

(51) Int. Cl.
  *H04L 29/06* (2006.01)
  *G06K 19/06* (2006.01)
    (Continued)

(52) U.S. Cl.
  CPC .......... *H04L 9/06* (2013.01); *G06K 19/06018* (2013.01); *H04L 9/0866* (2013.01); *H04L 9/3268* (2013.01)

(58) Field of Classification Search
  CPC ....... H04L 9/06; H04L 9/0866; H04L 9/3268; H04L 9/3247; H04L 63/0861;
    (Continued)

(56) References Cited

U.S. PATENT DOCUMENTS

| | | | |
|---|---|---|---|
| 9,619,639 B2 | 4/2017 | Donenfeld | |
| 9,715,686 B2 | 7/2017 | Sadacharam | |

(Continued)

FOREIGN PATENT DOCUMENTS

| | | |
|---|---|---|
| GB | 2600924 A | 5/2022 |
| JP | 2006503374 A | 1/2006 |
| KR | 101561170 B1 | 10/2015 |

OTHER PUBLICATIONS

Choudhury et al., "Biometric Passport Security by Applying Encrypted Biometric Data Embedded in the QR Code", Part of the Advances in Intelligent Systems and Computing book series, AISC, vol. 1079, Springer, Jan. 2020, 12 Pages.

*Primary Examiner* — Yogesh Paliwal
(74) *Attorney, Agent, or Firm* — Michael O'Keefe

(57) ABSTRACT

According to one embodiment, a method, computer system, and computer program product for privacy-enhanced, bio-metrics-based authentication is provided. The embodiment may include capturing credential information on a credential medium and biometric information for a user, each provided by the user, by one or more information capture devices. The embodiment may also include identifying a hash stored on the credential medium based on the captured credential information. The embodiment may further include calculating, locally, a hash of the biometric information using a preconfigured hashing algorithm. The embodiment may also include, in response to the identified hash matching the calculated hash, authenticating the user.

9 Claims, 6 Drawing Sheets

(51) Int. Cl.
*H04L 9/06* (2006.01)
*H04L 9/08* (2006.01)
*H04L 9/32* (2006.01)

(58) Field of Classification Search
CPC ... G06K 19/06018; G06F 21/32; G06F 21/33;
G06F 21/64
See application file for complete search history.

(56) References Cited

U.S. PATENT DOCUMENTS

| | | | |
|---|---|---|---|
| 10,931,461 B2 | 2/2021 | Dilles | |
| 10,990,776 B2 | 4/2021 | Azanza Ladrón | |
| 11,165,581 B2 | 11/2021 | Hunt | |
| 2004/0243806 A1* | 12/2004 | McKinley | G06Q 20/3823 |
| | | | 713/176 |
| 2012/0138679 A1 | 6/2012 | Doyle | |
| 2013/0214043 A1 | 8/2013 | Kong | |
| 2016/0071101 A1 | 3/2016 | Winarski | |
| 2016/0248759 A1* | 8/2016 | Tsurumi | G06F 21/41 |
| 2017/0053252 A1 | 2/2017 | Votaw | |
| 2017/0085562 A1* | 3/2017 | Schultz | G06V 40/1371 |
| 2017/0243041 A1* | 8/2017 | Arce | G06K 19/06056 |
| 2017/0264608 A1 | 9/2017 | Moore | |
| 2018/0075229 A1* | 3/2018 | Jan | G06F 21/35 |
| 2020/0042685 A1 | 2/2020 | Tussy | |
| 2021/0011986 A1 | 1/2021 | Tussy | |
| 2022/0103362 A1 | 3/2022 | Chafni | |

* cited by examiner

100

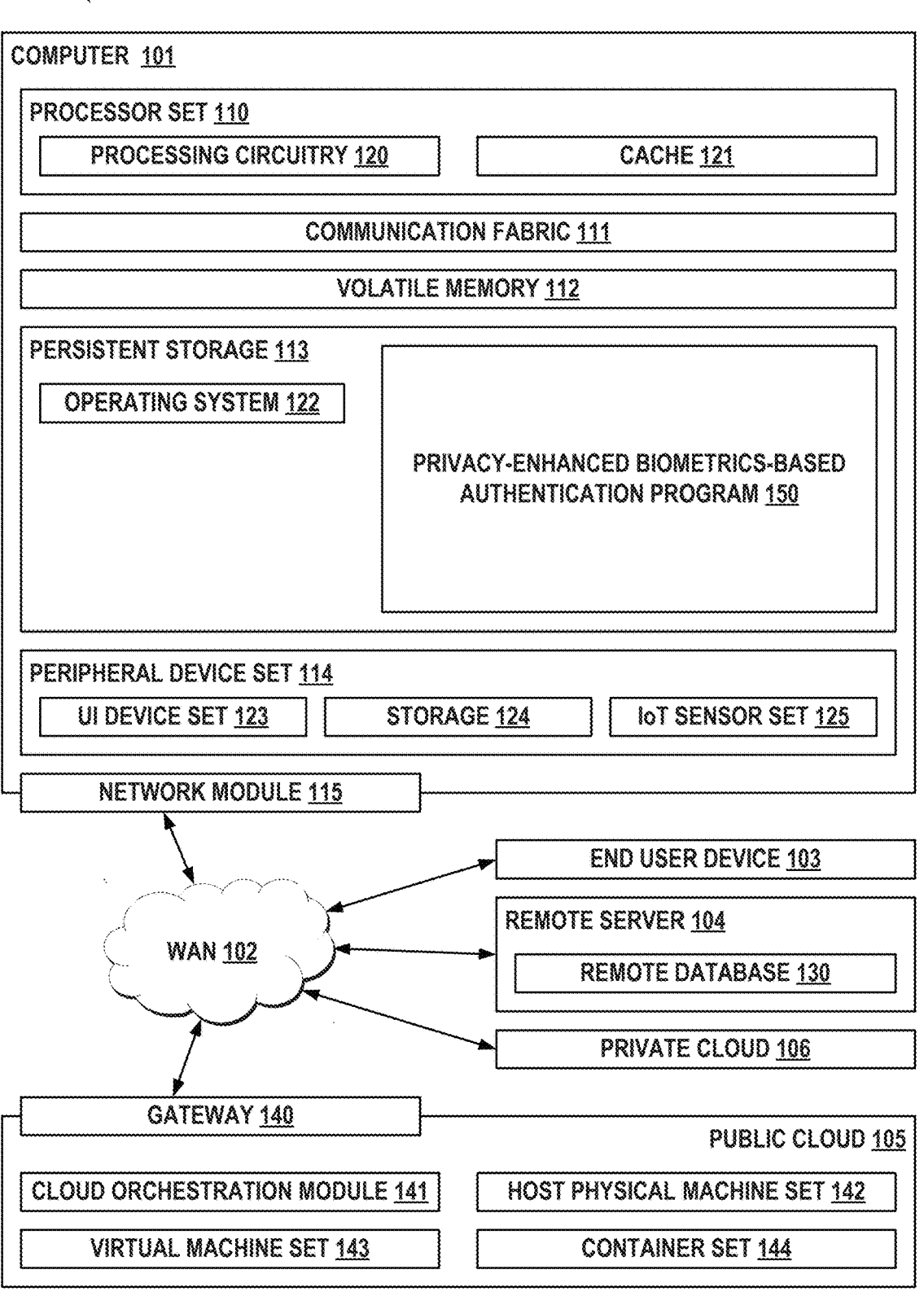

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

PRIVACY-ENHANCED BIOMETRICS-BASED AUTHENTICATION PROGRAM 150

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

START

Receive a request for a credential from a user. 202

Identify the user through a preexisting authentication method. 204

Capture one or more user biometrics. 206

Calculate a hash of the one or more captured biometrics. 208

Sign the calculated hash with a private certificate. 210

Store the signed hash in a credential media. 212

END

500

ENHANCING PRIVACY IN BIOMETRICS-BASED AUTHENTICATION SYSTEMS

BACKGROUND

The present invention relates generally to the field of computing, and more particularly to authentication.

As technology advances, society relies more and more heavily on innovations throughout everyday life. With more reliance on technology, a growing concern emerges for ethical uses of technology to ensure individual privacy and avoid misuse of collected data for unintended purposes. Authentication systems aim to create a balance for the protection of information and maintain security while granting authorized individuals access when and where such access is warranted.

Authentication relates to a process of validating, or establishing, the identity of an individual for security purposes. Despite having many uses in the physical words, the computing realm utilizes authentication to provide credentials to a user that verify the user's identity to operate a device or program or access a digital location or specific data. Concerns surrounding certain data privacy issues, such as identity fraud, result in a strong focus on proper authentication processes.

Authentication performed electronically typically relies on transmitting responses to security question prompts and captured biometric identifiers, such as fingerprints, eye scans, and/or facial recognition, from a user device to an authentication server across a network. Electronic authentication mechanisms raise concerns about the authenticity of the authentication process since the individual providing the credentials may not be the individual they are purporting to be as seen in cases of identity fraud. Furthermore, typical methods of electronic authentication that transmit sensitive or confidential data across a network may expose the transmitted data to unauthorized individuals either through malicious actions to access the data by the unauthorized individual or inadvertently through a mistake or error by the transmitting program or device. Through these actions, typical forms of electronic authentication are vulnerable to attacks that capture network traffic including, but not limited to, transmissions of security questions, answers to security questions, biometric identifiers, and requests for biometric identifiers, the interception of which may result in catastrophic breaches of sensitive or confidential data.

SUMMARY

According to one embodiment, a method, computer system, and computer program product for privacy-enhanced, biometrics-based authentication is provided. The embodiment may include capturing credential information on a credential medium and biometric information for a user, each provided by the user, by one or more information capture devices. The embodiment may also include identifying a hash stored on the credential medium based on the captured credential information. The embodiment may further include calculating, locally, a hash of the biometric information using a preconfigured hashing algorithm. The embodiment may also include, in response to the identified hash matching the calculated hash, authenticating the user.

In a preferred embodiment, the embodiment further includes, in response to the identified hash not matching the calculated hash, denying authentication to the user and notifying the user of the denied authentication.

In a preferred embodiment, the embodiment further includes determining whether the identified hash is signed by an organization based on a read and/or decryption of the identified hash using a public certificate returns an expected result.

In a preferred embodiment, the embodiment further includes determining one or more access restrictions within the captured credential information and, in response to the user being permitted to a location based on the one or more determined access restrictions, granting the user access to the location.

In a preferred embodiment, the one or more information capture devices are selected from a group consisting of a QR code scanner, a barcode scanner, a NFC reader, an RFID scanner, an image capture device, an optical sensor, a capacitive scanner, an ultrasonic sensor, and a thermal line sensor.

According to another embodiment, a method, computer system, and computer program product for privacy-enhanced, biometrics-based authentication is provided. The embodiment may include receiving a request for a credential medium from a user. The embodiment may also include identifying the user through an authentication process. The embodiment may further include, in response to the authentication process validating the user, capturing one or more biometrics of the user. The embodiment may also include calculating a hash of the one or more captured biometrics using a preconfigured hashing algorithm. The embodiment may also include signing the calculated hash with a private certificate. The embodiment may further include storing the signed hash on the credential media.

In a preferred embodiment, the hash is stored on the credential media using a quick response (QR) code.

In a preferred embodiment, the hash is stored on the credential media using a near field communication (NFC) chip.

In a preferred embodiment, the private certificate is loaded either locally or through a security system.

In a preferred embodiment, the embodiment further includes configuring one or more access restrictions for the user to a public certificate, where the one or more access restrictions are selected from a group consisting of a date of permitted access, one or more times of permitted access, a permitted access location, and a maximum number of accesses.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment.

DETAILED DESCRIPTION

Figure 2:
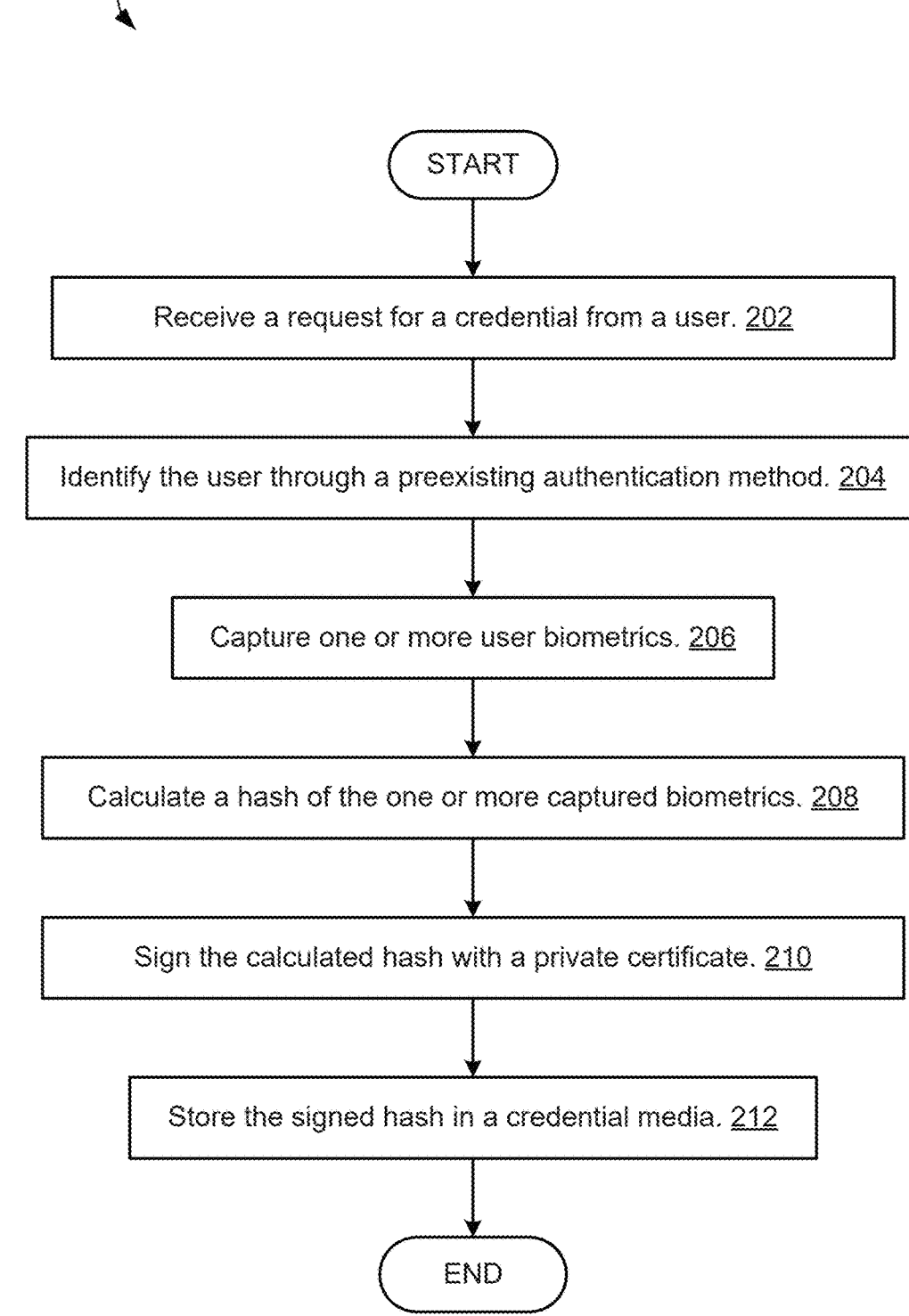
FIG. 2 illustrates an operational flowchart for a privacy-enhanced, biometrics-based authentication process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to authentication. The following described exemplary embodiments provide a system, method, and program product to, among other things, cryptographically authenticate an individual through a physical form of identification against the individual's biometric data without prior exposure to the biometric data presented. Therefore, the present embodiment has the capacity to improve the technical field of authentication by facilitating authentication without retention of sensitive personal information, such as biometric data, in a database. Furthermore, the present embodiment may allow offline or disconnected devices to perform authentication without connection to a network thereby allowing deployment of authentication across a broad set of locations. Additionally, a combination of the previous two items illustrates that the present embodiment may not require the transmission of sensitive data typically required for authentication across a network due to no requirement for database-level storage of the sensitive information or network access. Furthermore, by delegating biometric authentication, the present embodiment may allow a checks and balances system through enrollment of a third-party public certificate thereby allowing the authentication to be processed by a trusted third party.

As previously described, as technology advances, society relies more and more heavily on innovations throughout everyday life. With more reliance on technology, a growing concern emerges for ethical uses of technology to ensure individual privacy and avoid misuse of collected data for unintended purposes. Authentication systems aim to create a balance for the protection of information and maintain security while granting authorized individuals access when and where such access is warranted.

Authentication relates to a process of validating, or establishing, the identity of an individual for security purposes. Despite having many uses in the physical words, computing realm utilizes authentication to provide credentials to a user that verify the user's identity to operate a device or program or access a digital location or specific data. Concerns surrounding certain data privacy issues, such as identity fraud, result in a strong focus on proper authentication processes.

Authentication performed electronically typically relies on transmitting responses to security question prompts and captured biometric identifiers, such as fingerprints, eye scans, and/or facial recognition, from a user device to an authentication server across a network. Electronic authentication mechanisms raise concerns about the authenticity of the authentication process since the individual providing the credentials may not be the individual they are purporting to be as seen in cases of identity fraud. Furthermore, typical methods of electronic authentication that transmit sensitive or confidential data across a network may expose the transmitted data to unauthorized individuals either through malicious actions to access the data by the unauthorized individual or inadvertently through a mistake or error by the transmitting program or device. Through these actions, typical forms of electronic authentication are vulnerable to attacks that capture network traffic including, but not limited to, transmissions of security questions, answers to security questions, biometric identifiers, and requests for biometric identifiers, the interception of which may result in catastrophic breaches of sensitive or confidential data. As such, it may be advantageous to, among other things, implement an authentication solution that addresses common security and/or privacy concerns while also providing the same level of assurance.

According to one embodiment, a privacy-enhanced, biometrics-based authentication program may privately authenticate a person using biometrics without sharing or enrolling the individual to allow for secure authentication without sharing personal information over a network. The privacy-enhanced, biometrics-based authentication program may generate a cryptographically-trusted credential for an individual that contains a quick response (QR) code that includes a calculated hash of the individual's biometrics and is signed using a digital certificate. Furthermore, the privacy-enhanced, biometrics-based authentication program may include a time-variable seed of the hashing algorithm produced using different hashes at different times for the same input. Therefore, malicious attacks may provide fruitless.

At the time of authentication, the privacy-enhanced, biometrics-based authentication program may read the QR code and validate the digital signature within. If valid, the privacy-enhanced, biometrics-based authentication program may then read the individual's biometrics, calculate the hash, and compare the calculated hash to the hash within the QR code presented in the credential. If the time-variable hashes match, the privacy-enhanced, biometrics-based authentication program may allow access to the protected area to the individual during an authorized timeframe.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as privacy-enhanced, biometrics-based authentication program 150. In addition to privacy-enhanced, biometrics-based authentication program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and privacy-enhanced, biometrics-based authentication program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in privacy-enhanced, biometrics-based authentication program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in privacy-enhanced, biometrics-based authentication program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the privacy-enhanced, biometrics-based authentication program 150 may perform a credential creation process where an individual is identified through one or more preexisting authentication methods. Once authenticated using preexisting methods, the privacy-enhanced, biometrics-based authentication program 150 may generate a private certificate that is signed using one or more hashed biometrics. The privacy-enhanced, biometrics-based authentication program 150 may then record the signed hash to the credentialed medium or media, such as a QR code on an identification badge. When performing authentication using the credential media, the privacy-enhanced, biometrics-based authentication program 150 may authenticate the individual through a decryption of the hash recorded to the credential media as presented at the time of authentication compared to a hashing of biometrics provided by the individual at the time of authentication. If the hash recorded to the credentialed media and the biometric hash provided by the individual match, the privacy-enhanced, biometrics-based authentication program 150 may authenticate the individual and allow the desired access. Furthermore, notwithstanding depiction in computer 101, the privacy-enhanced, biometrics-based authentication program 150 may be stored in and/or executed by, individually or in any combination, end user device 103, remote server 104, public cloud 105, and private cloud 106. The privacy-enhanced, biometrics-based authentication method is explained in more detail below with respect to FIGS. 2-4 and 5A-5B.

Referring now to FIG. 2, an operational flowchart for a privacy-enhanced, biometrics-based authentication process 200 is depicted, according to at least one embodiment. At 202, the privacy-enhanced, biometrics-based authentication program 150 receives a request for a credential from a user. The privacy-enhanced, biometrics-based authentication program 150 may receive a request to generate a new credential under a variety of circumstances, such as a guest visiting a location or needing temporary access to data or a new employee requiring certain access across a facility. The request to the privacy-enhanced, biometrics-based authentication program 150 may include identifying information for the user to receive the credential. Furthermore, the privacy-enhanced, biometrics-based authentication program

150 may receive the request from an already-credentialed individual, such as a system administrator or a facility or office manager.

Next, at 204, the privacy-enhanced, biometrics-based authentication program 150 identifies the user through a preexisting authentication method. In order to verify the identity of the user for whom the credential will be generated, the privacy-enhanced, biometrics-based authentication program 150 may require a one-time authentication of the user through a preexisting authentication method, such username and password, an organization-issued identification card, a government-issued identification card, etc. In the situation where the user will be granted access for an indefinite period of time (e.g., a new hire employee), the privacy-enhanced, biometrics-based authentication program 150 may access a repository containing employee directory information to ensure the user is in fact an organizational member. In the situation where the user will be granted temporary access for a preconfigured period of time (e.g., a guest), the privacy-enhanced, biometrics-based authentication program 150 may require an organizational member (e.g., an administrator, guest host, or manager) to vouch for the user guest and the level of access granted to the user guest.

Then, at 206, the privacy-enhanced, biometrics-based authentication program 150 captures one or more user biometrics. Once the privacy-enhanced, biometrics-based authentication program 150 authenticates the user through a preexisting authentication method, the privacy-enhanced, biometrics-based authentication program 150 may prompt the user to provide one or more items of biometric measurements, including, but not limited to, physiological identifiers, DNA recognition, ear recognition, iris scanning, retina recognition, face recognition, fingerprinting, finger geometry recognition, hand geometry, odor recognition, vein recognition, behavioral identifiers, gait recognition, keystroke recognition, voice biometrics, and signature recognition. The privacy-enhanced, biometrics-based authentication program 150 may capture the biometric data through one or more known methods of biometric capture, such as a camera communicatively coupled to a user device.

Next, at 208, the privacy-enhanced, biometrics-based authentication program 150 calculates a hash of the one or more captured biometrics. The privacy-enhanced, biometrics-based authentication program 150 may then use the captured biometric data to calculate a hash. Hashing may relate to transforming data, usually characters, into a shorter fixed-length value or key that is representative of the original string of data. With respect to the captured biometric data, the privacy-enhanced, biometrics-based authentication program 150 may utilize a predefined hashing algorithm capable of ingesting the biometric data and outputting a hash.

Then, at 210, the privacy-enhanced, biometrics-based authentication program 150 signs the calculated hash with a private certificate. The privacy-enhanced, biometrics-based authentication program 150 may, either upon first authenticating the user or upon hashing the biometric data, load a private certificate of the organization. The privacy-enhanced, biometrics-based authentication program 150 may load the private certificate either locally or through any preexisting security system. Once the private certificate is loaded and the biometric data is hashed, the privacy-enhanced, biometrics-based authentication program 150 may sign the hash with the private certificate. During the signing process, the privacy-enhanced, biometrics-based authentication program 150 may also encrypt the generated hash.

Next, at 212, the privacy-enhanced, biometrics-based authentication program 150 stores the signed hash in a credential media. Finally, the privacy-enhanced, biometrics-based authentication program 150 may store the signed hash in the credential media, which may include a digital media format, such as a QR code or an near field communication (NFC) chip. In one or more embodiments, the privacy-enhanced, biometrics-based authentication program 150 may utilize other organization identification information, such as card number and employee number, to allow for a more flexible policy, such as individuals are allowed two accesses per day.

Once the signed hash is loaded to the credential media, the privacy-enhanced, biometrics-based authentication program 150 may allow the user to utilize the credential media to verify the user's identity (e.g., authenticate the user) without transmitting user identifying information across a network. For example, a user wishing to access a secured location to which they are privileged to access, may present a credential with a QR code printed on the credential face. The privacy-enhanced, biometrics-based authentication program 150 may read the QR code through standard scanning techniques and prompt the user to also provide biometric data, such as a fingerprint scan. The privacy-enhanced, biometrics-based authentication program 150 may then hash the captured biometric data locally and compare the two hashes (i.e., the hash stored on the digital media created during credential creation and the hash generated from the biometric data captured at the time of the user access request to the secure location). If the two hashes match, the privacy-enhanced, biometrics-based authentication program 150 may authenticate the user and allow the user access to the secure location.

As such, the privacy-enhanced, biometrics-based authentication program 150 may allow the authentication process to perform its function in a secure, safe, and pervasive manner. The privacy-enhanced, biometrics-based authentication program 150 may ensure the security of the authentication process by using biometrics and cryptography to authenticate a user. The privacy-enhanced, biometrics-based authentication program 150 may ensure the safety of the authentication process by not storing sensitive, personal information on user devices subject to data breaches. Furthermore, the privacy-enhanced, biometrics-based authentication program 150 may ensure the pervasiveness of the authentication process by allowing offline and/or disconnected devices to perform authentication of a user thereby enabling the deployment of authentication devices across a broad set of locations.

Additionally, the privacy-enhanced, biometrics-based authentication program 150 may be implemented in various use case scenarios. For example, the privacy-enhanced, biometrics-based authentication program 150 may allow physical access to a building to a previously unknown member of an organization, such as a courier delivering a package. As a further example, the privacy-enhanced, biometrics-based authentication program 150 may allow for the enrollment and badge issuance of organization members without storing sensitive information (e.g., biometric information, personally identifiable information, etc.) for each member on a centralized server.

Figure 3:
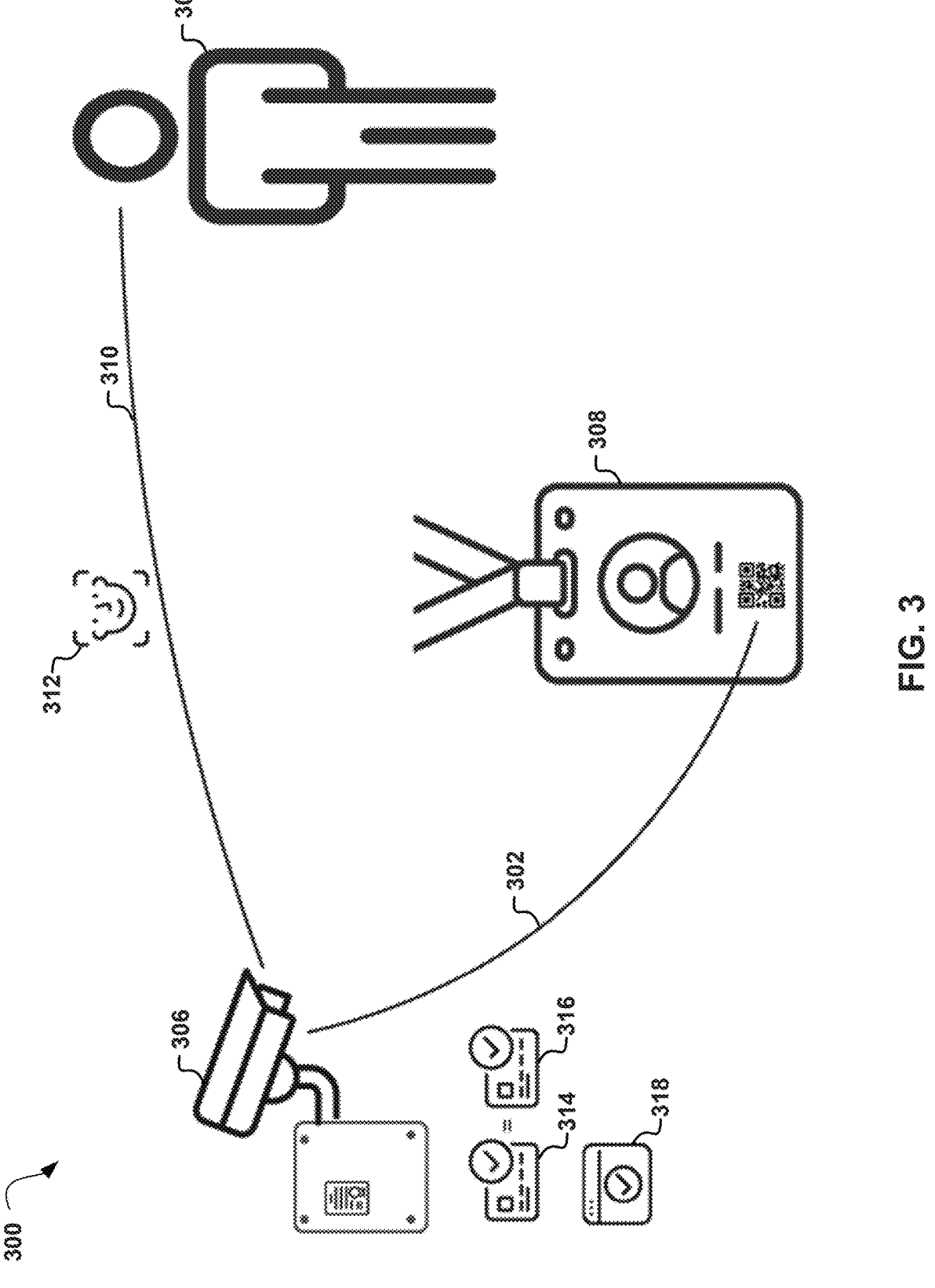
FIG. 3 illustrates an exemplary block diagram of the privacy-enhanced, biometrics-based authentication process according to at least one embodiment.

Referring now to FIG. 3, an exemplary block diagram of the privacy-enhanced, biometrics-based authentication process 300 is depicted according to at least one embodiment. At 302, when a user 304 already in possession of a digital media credential 308 wishes to utilize the credential 308 to enter a secure facility, the user 304 may present the credential 308 to an optical scanner 306, such as camera, to read the digital media credential 308. The privacy-enhanced, biometrics-based authentication program 150 may extract a hash from the digital media credential 308 based on the reading from the optical scanner. At 310, the optical scanner 306 may then proceed to capture biometrics 312 of the user 304, such as a facial scan or a fingerprint. The privacy-enhanced, biometrics-based authentication program 150 may implement a preconfigured hashing algorithm, such as the same hashing algorithm used to generate the hash stored on and extracted from the digital media credential, to generate a hash of the user biometrics. The privacy-enhanced, biometrics-based authentication program 150 may then compare the two hashes (i.e., the hash 314 extracted from a scan of the digital media credential 308 and the hash 316 generated from the captured user biometrics 312). At 318, if the two hashes 314, 316 match to within a preconfigured threshold percentage, the privacy-enhanced, biometrics-based authentication program 150 may grant user 304 access to the desired location. However, if the two hashes do not match to within a preconfigured threshold percentage, the privacy-enhanced, biometrics-based authentication program 150 may deny user 304 access to the desired location.

Figure 4:
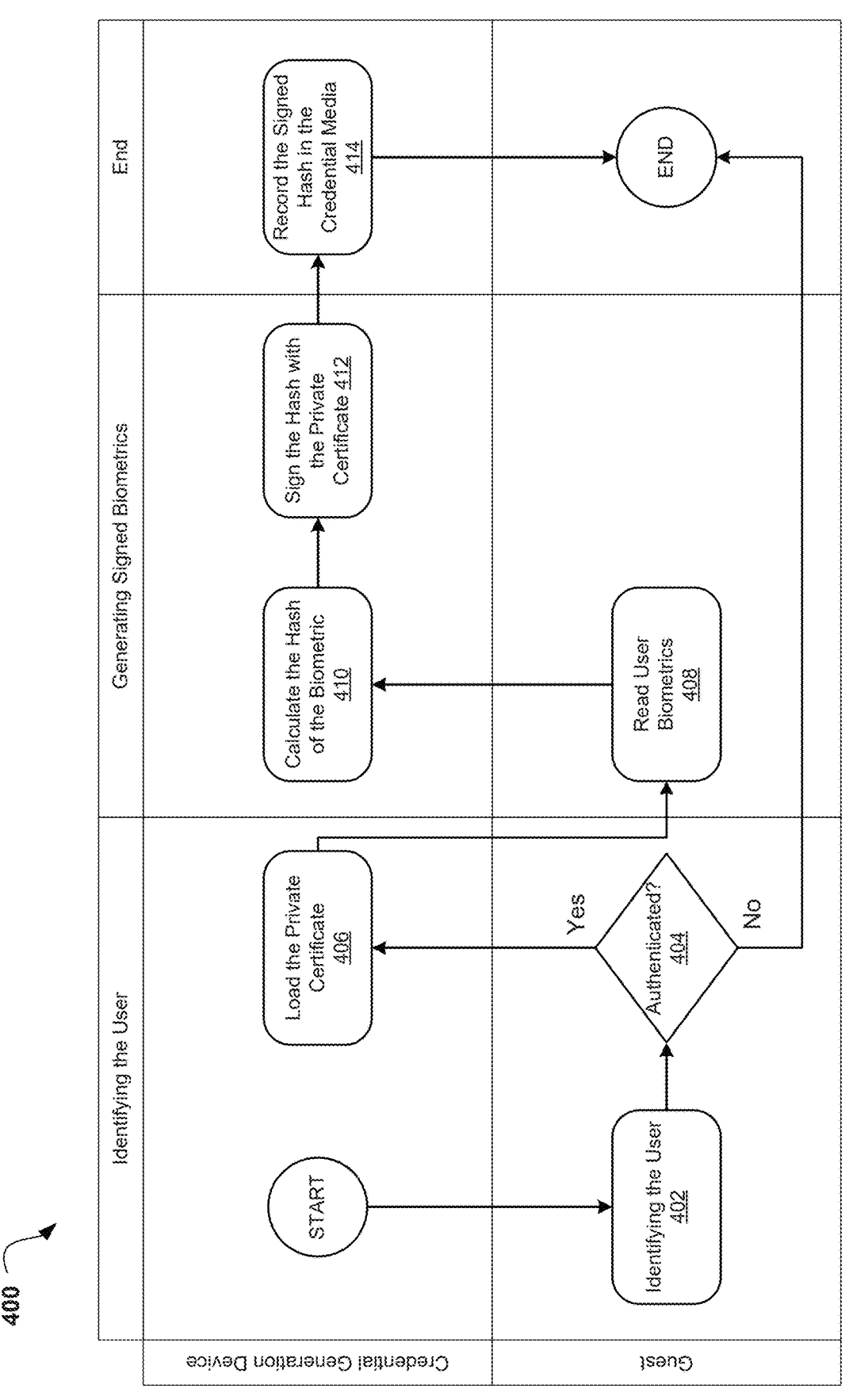
FIG. 4 illustrates an exemplary block diagram of a credential creation process according to at least one embodiment.

Referring now to FIG. 4, an exemplary block diagram of a credential creation process 400 is depicted according to at least one embodiment. At 402, the privacy-enhanced, biometrics-based authentication program 150 identifies the user. Prior to beginning any generation of a credential, the privacy-enhanced, biometrics-based authentication program 150 may require an identification of the individual wishing to obtain the credential. The privacy-enhanced, biometrics-based authentication program 150 may achieve identification of the individual through one or more identification processes, such as, but no limited to, user ID and password, organization-issued identification card, an employee number lookup in an organization directory, a vocal analysis, fingerprint scan, retinal scan, and facial recognition.

Then, at 404, the privacy-enhanced, biometrics-based authentication program 150 determines whether to authenticate the user. The privacy-enhanced, biometrics-based authentication program 150 may facilitate the identification of the individual by comparing information presented by the one or more identification processes against information in a repository available to the privacy-enhanced, biometrics-based authentication program 150. For example, if the user, such as an organization employee, presents a fingerprint scan as proof of identification, the privacy-enhanced, biometrics-based authentication program 150 may compare the provided fingerprint information against known fingerprint scans for the employee in an organizational database of biometrics data utilized for security access to specific organization site locations. If the privacy-enhanced, biometrics-based authentication program 150 determines to authenticate the user (step 404, "Yes" branch), then the credential creation process 400 may proceed to step 406 to load the private certificate. If the privacy-enhanced, biometrics-based authentication program 150 determines to not authenticate the user (step 404, "No" branch), then the credential creation process 400 may end.

Next, at 406, the privacy-enhanced, biometrics-based authentication program 150 loads the private certificate. The privacy-enhanced, biometrics-based authentication program 150 may load the private certificate to a credential generation device, which may be a separate hardware device capable of generating credentials, such as an employee badge. The privacy-enhanced, biometrics-based authentication program 150 may load the private certificate either locally or through any preexisting security system.

Then, at 408, the privacy-enhanced, biometrics-based authentication program 150 reads user biometrics. The privacy-enhanced, biometrics-based authentication program 150 may read user biometrics through a variety of biometric capture devices. A biometric captures device may include any device capable of collecting biometric characteristics and converting the collected characteristics to a biometric sample. Common biometric capture devices include, but not limited to, a retinal scanner, a fingerprint reader, and an image capture device. The privacy-enhanced, biometrics-based authentication program 150 may convert the capture biometrics into biometric data representative of the captured biometrics. For example, the privacy-enhanced, biometrics-based authentication program 150 may utilize a fingerprint scanner to capture a user fingerprint and convert the user fingerprint into digital information.

Next, at 410, the privacy-enhanced, biometrics-based authentication program 150 calculates a hash of the biometrics. Once the privacy-enhanced, biometrics-based authentication program 150 has captured the user biometric data, the privacy-enhanced, biometrics-based authentication program 150 may convert the biometric data to a hash. As previously described, hashing relates to transforming data, usually characters, into a shorter fixed-length value or key that is representative of the original strong of data. The privacy-enhanced, biometrics-based authentication program 150 may utilize a predefined hashing algorithm to generate the hash of the biometric data. The generated hash may represent a unique digital representation of the biometric data specific to the user.

Then, at 412, the privacy-enhanced, biometrics-based authentication program 150 signs the hash with the private certificate. In computing, signing relates to utilizing a public-private encryption scheme to ensure data security. The privacy-enhanced, biometrics-based authentication program 150 may sign the hash with the private certificate. In this manner, the hash signed to the private certificate may represent the private key in the signing process.

Next, at 414, the privacy-enhanced, biometrics-based authentication program 150 records the signed hash in the credential media. Once the hash is signed, the privacy-enhanced, biometrics-based authentication program 150 may record the signed has to the credential media for later use during an authentication process. The privacy-enhanced, biometrics-based authentication program 150 may record the signed hash to the credential media through a variety of recording processes including, but not limited to, loading the signed hash to an NFC chip or printing a QR code to the credential media. For example, the privacy-enhanced, biometrics-based authentication program 150 may print a QR code that represents the signed hash on an employee access badge.

Figure 5A:
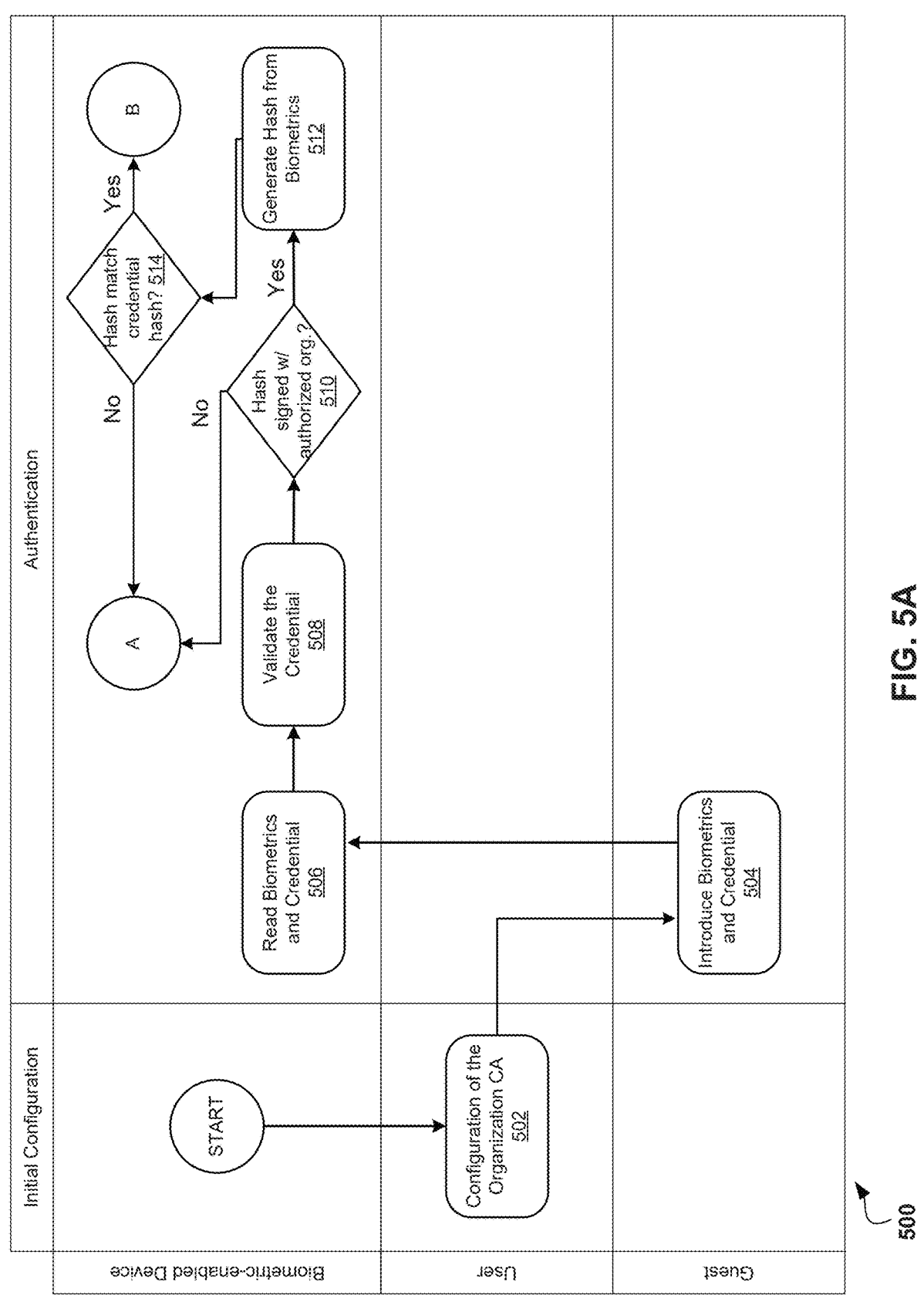
FIGS. 5A and 5B illustrate an exemplary block diagram of a credential authentication process according to at least one embodiment.
Figure 5B:
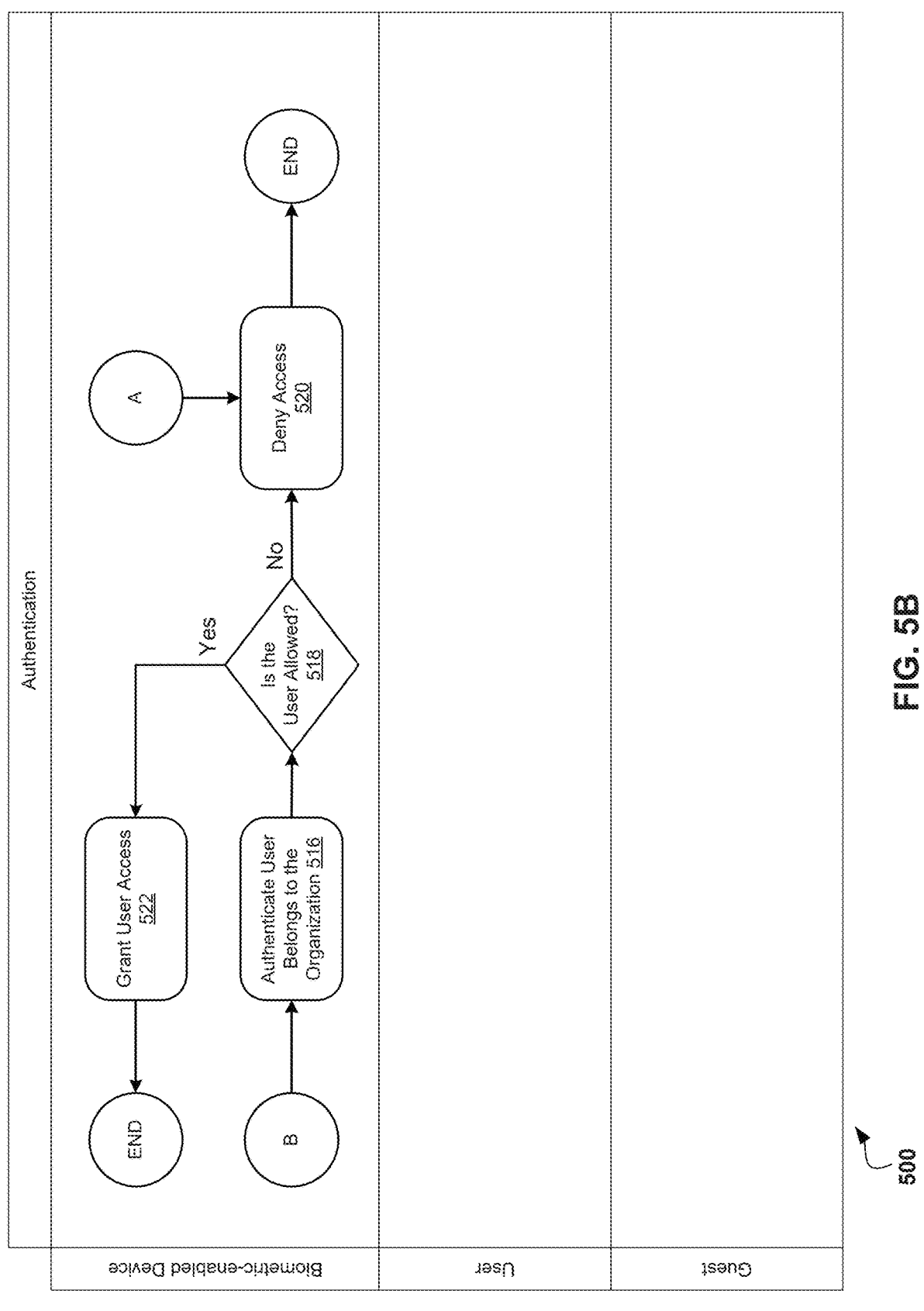

Referring now to FIGS. 5A and 5B, an exemplary block diagram of a credential authentication process 500 is depicted according to at least one embodiment. Upon receiving a credential, the privacy-enhanced, biometrics-based authentication program 150 may allow a user to utilize the credential to access various locations at times of the user's choosing once the user has presented the credential and one or more biometrics. In effect, the privacy-enhanced, biometrics-based authentication program 150 utilizes the credential and the biometrics as two-factor authentication of the user's identity without needing to connect to a central server or repository or storing the user credentials locally on a security device, such as computer 101, or remotely, such as on remote server 104.

Referring now to FIG. 5A, at 502, the privacy-enhanced, biometrics-based authentication program 150 performs a configuration of the organization credential authorization. The privacy-enhanced, biometrics-based authentication program 150 may allow an individual, such as an administrator or a manager, to configure various aspects of organization credential authorization for a specific individual. The privacy-enhanced, biometrics-based authentication program 150 may configure the organization credential authorization to include various restrictions surrounding the access granted to the user, such as, but not limited to, access date(s), access time(s), access location(s), and maximum number of accesses. For example, privacy-enhanced, biometrics-based authentication program 150 may receive direction, in the form of user interactions with one or more peripheral devices, from a facilities manager to grant access to an employee during weekday working hours for an indefinite time period with unlimited accesses. Similarly, the privacy-enhanced, biometrics-based authentication program 150 may receive direction from a manager overseeing a guest visiting a site to allow site access to a specific location on the site for a single day during a two-hour window with only a single access entry.

Then, at 504, the privacy-enhanced, biometrics-based authentication program 150 introduces biometrics and credentials. As the now-credentialed user attempts to gain access using the credential, the privacy-enhanced, biometrics-based authentication program 150 may prompt the user to present the user credential and one or more biometrics. For example, the privacy-enhanced, biometrics-based authentication program 150 may identify the user has approached a secured access door to a restricted location on a site. As such, the privacy-enhanced, biometrics-based authentication program 150 may direct, perhaps through a graphical user interface or audio prompt, to present user credentials and user biometrics at one or more corresponding scanners.

Next, at 506, the privacy-enhanced, biometrics-based authentication program 150 reads the user biometrics and credentials. Using corresponding scanning devices, the privacy-enhanced, biometrics-based authentication program 150 may read the provided user credential and user biometrics. The privacy-enhanced, biometrics-based authentication program 150 may utilize one or more types of devices to capture credential information read from the user credential including, but not limited to, a QR code scanner, a barcode scanner, a NFC reader, an RFID scanner, and an image capture device (e.g., a camera). As previously described, the privacy-enhanced, biometrics-based authentication program 150 may also utilize one or more biometric scanners to capture the user biometrics, such as, but not limited to, optical sensors, capacitive scanners, ultrasonic sensors, thermal line sensors. The privacy-enhanced, biometrics-based authentication program 150 may utilize the various items of biometric measurements captured by the biometric scanners and the credential information to validate the user.

Then, at 508, the privacy-enhanced, biometrics-based authentication program 150 validates the use credentials. The privacy-enhanced, biometrics-based authentication program 150 may validate the credential by isolating the hash encrypted on the user credential and subsequently attempting to read and decrypt the credential media using the public certificate of the expected, authorized organization. The privacy-enhanced, biometrics-based authentication program 150 may identify the hash presented on the credential media to determine whether the credential is authentically originated from the organization.

Next, at 510, the privacy-enhanced, biometrics-based authentication program 150 determines whether the hash is signed with an authorized organization. Once the privacy-enhanced, biometrics-based authentication program 150 isolates the hash information on the presented user credential, the privacy-enhanced, biometrics-based authentication program 150 may analyze the hash to determine whether the hash is signed with the authorized organization. The privacy-enhanced, biometrics-based authentication program 150 may determine the hash is signed with the organization by trying to read and/or decrypt the credential media using the public certificate of the expected, authorized organization. In another embodiment, the privacy-enhanced, biometrics-based authentication program 150 may utilize a certificate specifically generated for the user and authenticating the user rather than an organization-wide certificate. For example, if an affiliate will be sending a guest to visit a specific organization location that the guest will require credentialed access, the privacy-enhanced, biometrics-based authentication program 150 may generate a public certificate with the exact dates and times where the visit will take place. By doing so, the privacy-enhanced, biometrics-based authentication program 150 may allow user assurance that the authorized guest will gain access only during the pre-configured dates and times to the authorized locations.

If the privacy-enhanced, biometrics-based authentication program 150 determines the hash is signed with an authorized organization (step 510, "Yes" branch), then the credential authentication process 500 may proceed to step 512 to generate a hash from user biometrics in order to determine if the user presenting the credential is the individual authorized to hold and present the credential. If the privacy-enhanced, biometrics-based authentication program 150 determines the hash is not signed with an authorized organization (step 510, "No" branch), then the credential authentication process 500 may continue to step 520 to deny access to the user.

Then, at 512, the privacy-enhanced, biometrics-based authentication program 150 generates a hash from the biometrics. Since the hash stored on the credential media is based on the authorized user's biometrics, the privacy-enhanced, biometrics-based authentication program 150 may perform a comparison of the decrypted hash to a new hash of the user biometrics presented at the time of authentication in step 506 using the predefined hashing algorithm. The privacy-enhanced, biometrics-based authentication program 150 may generate the hash following, or substantially similar to, step 208.

Next, at 514, the privacy-enhanced, biometrics-based authentication program 150 determines whether the hash matches the credential hash. The privacy-enhanced, biometrics-based authentication program 150 may determine whether the biometric hash generated in step 512 matches the credential hash extracted from the user credential in step 510 through a comparison analysis of the two hashes. If the privacy-enhanced, biometrics-based authentication program 150 determines the biometric hash matches the user credential hash (step 514, "Yes" branch), then the credential authentication process 500 may proceed to step 516 to authenticate the user belongs to the organization. If the privacy-enhanced, biometrics-based authentication program 150 determines the biometric hash does not match the user credential hash (step 514, "No" branch), then the credential authentication process 500 may continue to step 520 to deny access to the user.

Referring now to FIG. 5B, at 516, the privacy-enhanced, biometrics-based authentication program 150 authenticates that the user belongs to the organization. Once the privacy-enhanced, biometrics-based authentication program 150 determines a match exists between the biometric hash and the user credential hash, the privacy-enhanced, biometrics-based authentication program 150 may authenticate the user as being an authorized member of the organization and authorized to enter the location.

Then, at 518, the privacy-enhanced, biometrics-based authentication program 150 determines whether the user is allowed in the location. The privacy-enhanced, biometrics-based authentication program 150 may determine, although a user is an authenticated member of the organization, the user may not be entitled to entry to the secured location. In order to determine whether the user is permitted access to the location, the privacy-enhanced, biometrics-based authentication program 150 may analyze the time restrictions and number of accesses associated with the user's credentials by analyzing the configuration performed in step 502. The privacy-enhanced, biometrics-based authentication program 150 may access the configuration information either embedded on a storage device associated with the user credential (e.g., an NFC chip) or otherwise readable on the user credential (e.g., QR code) or through a storage device locally or remotely accessible to the privacy-enhanced, biometrics-based authentication program 150. Since no sensitive or user identifiable information may be transferred across the network, the privacy-enhanced, biometrics-based authentication program 150 may maintain user data security despite this analysis of the configuration details.

If the privacy-enhanced, biometrics-based authentication program 150 determines the user is allowed in the location (step 514, "Yes" branch), then the credential authentication process 500 may proceed to step 522 to grant the user access. If the privacy-enhanced, biometrics-based authentication program 150 determines the user is not allowed in the location (step 514, "No" branch), then the credential authentication process 500 may continue to step 520 to deny access to the user.

Next, at 520, the privacy-enhanced, biometrics-based authentication program 150 denies access to the user. The privacy-enhanced, biometrics-based authentication program 150 may deny access to the user through a prompt on a graphical user interface of a computing device, such as computer 101, associated with an entry system to the secured location or any other notification mechanism available, such as an audio tone (e.g., buzzer sound), voice playback (e.g., recorded audio denying access), or illuminated indicator (e.g., red light).

In one or more embodiments, the privacy-enhanced, biometrics-based authentication program 150 may issue different hashes for different levels of security accesses. For example, a low-level access credential may include a different hash or hashing algorithm than a high-level access credential. If the privacy-enhanced, biometrics-based authentication program 150 determines, although the biometric hash and the user credential hash do not match and the user should not be granted access to the location, characteristics of each hash are similar enough, or a hashing of the user biometrics generates a match with a hashing algorithm associated with a different security clearance level, that the user is an authorized organization member but is not authorized to enter the specific location, then the privacy-enhanced, biometrics-based authentication program 150 may notify the user, through a graphical user interface, that the user is authorized to enter other areas at the location but not the specific area to which the user is currently attempting entry.

In one or more other embodiments, the privacy-enhanced, biometrics-based authentication program 150 may alert an administrator, such as a facilities manager, after a preconfigured number of attempts to enter a location to which the user is not authorized, which may include a single failed entry attempt. Similarly, the privacy-enhanced, biometrics-based authentication program 150 may prevent further access attempts to the secured location or any other location at the organization after a preconfigured number of failed attempts and require an administration to authorize reentry to the user for further attempts.

Then, at 522, the privacy-enhanced, biometrics-based authentication program 150 grants access to the user. The privacy-enhanced, biometrics-based authentication program 150 determines the biometric hash and the user credential hash match and that the credential configuration indicates the user is currently permitted access, the privacy-enhanced, biometrics-based authentication program 150 may grant access to the location through a confirmation and an unlocking and/or opening of an entryway to the location. Similar to how notifications may be provided when access is denied to the location, the privacy-enhanced, biometrics-based authentication program 150 may indicate authorization to enter the secured location through a graphical user interface or any other notification mechanism available, such as an audio tone (e.g., ding sound), voice playback (e.g., recorded audio granting access), or illuminated indicator (e.g., green light).

It may be appreciated that FIGS. 2-4 and 5A-5B provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

capturing user credential information on a credential medium, through a quick reference (QR) code, and biometrics from a user by one or more information capture devices, wherein the credential information comprises encrypted, hashed biometric information specific to the user, and wherein the one or more information capture devices are disconnected from a wide area network (WAN;

identifying a hash stored on the credential medium based on the captured credential information, wherein the hash is a private key in public-private encryption, and wherein the hash comprises a time-variable seed that produces different hashes at different times for a same input;

determining whether the identified hash is signed by an organization based on a read and/or decryption of the identified hash using a public certificate returns an expected result;

calculating, locally, a hash of the biometric information using a preconfigured hashing algorithm;

in response to the identified hash matching the calculated hash, authenticating the user;

determining one or more access restrictions within the captured credential information; and in response to the user being permitted to a location based on the one or more determined access restrictions, granting the user access to the location.

2. The method of claim 1, further comprising:

in response to the identified hash not matching the calculated hash:

denying an authentication of the user; and notifying the user of the denied authentication.

3. The method of claim 1, wherein the one or more information capture devices are selected from a group consisting of a QR code scanner, a barcode scanner, a NFC reader, an RFID scanner, an image capture device, an optical sensor, a capacitive scanner, an ultrasonic sensor, and a thermal line sensor.

4. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:

capturing user credential information on a credential medium, through a quick reference (QR) code, and biometrics from a user by one or more information capture devices, wherein the credential information comprises encrypted, hashed biometric information specific to the user, and wherein the one or more information capture devices are disconnected from a wide area network (WAN);

identifying a hash stored on the credential medium based on the captured credential information, wherein the hash is a private key in public-private encryption, and wherein the hash comprises a time-variable seed that produces different hashes at different times for a same input;

determining whether the identified hash is signed by an organization based on a read and/or decryption of the identified hash using a public certificate returns an expected result;

calculating, locally, a hash of the biometric information using a preconfigured hashing algorithm;

in response to the identified hash matching the calculated hash, authenticating the user;

determining one or more access restrictions within the captured credential information; and in response to the user being permitted to a location based on the one or more determined access restrictions, granting the user access to the location.

5. The computer system of claim 4, wherein the method further comprises:

in response to the identified hash not matching the calculated hash:

denying an authentication of the user; and notifying the user of the denied authentication.

6. The computer system of claim 4, wherein the one or more information capture devices are selected from a group consisting of a QR code scanner, a barcode scanner, a NFC reader, an RFID scanner, an image capture device, an optical sensor, a capacitive scanner, an ultrasonic sensor, and a thermal line sensor.

7. A computer program product, the computer program product comprising:

one or more computer-readable tangible storage medium and program instructions stored on at least one of the one or more tangible storage medium, the program instructions executable by a processor performing a method, the method comprising:

capturing user credential information on a credential medium, through a quick reference (QR) code, and biometrics from a user by one or more information capture devices, wherein the credential information comprises encrypted, hashed biometric information specific to the user, and wherein the one or more information capture devices are disconnected from a wide area network (WAN);

identifying a hash stored on the credential medium based on the captured credential information, wherein the hash is a private key in public-private encryption, and wherein the hash comprises a time-variable seed that produces different hashes at different times for a same input;

determining whether the identified hash is signed by an organization based on a read and/or decryption of the identified hash using a public certificate returns an expected result;

calculating, locally, a hash of the biometric information using a preconfigured hashing algorithm;

in response to the identified hash matching the calculated hash, authenticating the user;

determining one or more access restrictions within the captured credential information; and in response to the user being permitted to a location based on the one or more determined access restrictions, granting the user access to the location.

8. The computer program product of claim 7, wherein the method further comprises:

in response to the identified hash not matching the calculated hash:

denying an authentication of the user; and notifying the user of the denied authentication.

9. The computer program product of claim 7, wherein the one or more information capture devices are selected from a group consisting of a QR code scanner, a barcode scanner, a NFC reader, an RFID scanner, an image capture device, an optical sensor, a capacitive scanner, an ultrasonic sensor, and a thermal line sensor.

* * * * *